United States Patent [19]

Lu

[11] Patent Number: 4,505,961
[45] Date of Patent: Mar. 19, 1985

[54] MICROWAVABLE HEAT AND GREASE RESISTANT CONTAINERS AND METHOD FOR THEIR PREPARATION

[75] Inventor: Pang-Chia Lu, Belle Mead, N.J.

[73] Assignee: Mobil Oil Corporation, New York, N.Y.

[21] Appl. No.: 373,556

[22] Filed: Apr. 30, 1982

[51] Int. Cl.³ .................... B32B 5/18; B32B 7/00; B32B 27/08
[52] U.S. Cl. .................... 428/35; 428/319.7; 428/319.3; 428/509; 426/107; 426/113; 426/234
[58] Field of Search ............ 428/35, 509, 319.3, 428/319.7; 426/107, 113, 234

[56] References Cited

U.S. PATENT DOCUMENTS

| | | | |
|---|---|---|---|
| 2,628,923 | 2/1953 | Yaeger | 428/509 |
| 2,914,436 | 11/1959 | Nakielny | 428/509 |
| 3,444,283 | 5/1969 | Carlson, Jr. | 264/53 |
| 3,619,445 | 11/1971 | Carlson, Jr. | 264/565 |
| 4,086,287 | 4/1978 | Kaeding et al. | 585/466 |
| 4,205,114 | 5/1980 | Canterino et al. | 428/35 |
| 4,335,181 | 6/1982 | Marano, Jr. et al. | 428/319.3 |

OTHER PUBLICATIONS

R. T. Bogan et al., "Cellulose Derivatives, Esters", pp. 118–143, in *Kirk–Othmer Encyclopedia of Chemical Technology*, (3rd ed.), vol. 5, John Wiley & Sons, Inc., New York, N.Y., 1979.

R. E. Scales, "Cellulosic", *Modern Plastics Encyclopedia*, vol. 54, No. 10 A, Oct. 1977, (McGraw-Hill, Inc., New York, New York), pp. 21–22.

*Primary Examiner*—John E. Kittle
*Assistant Examiner*—Cynthia Hamilton
*Attorney, Agent, or Firm*—Alexander J. McKillop; Michael G. Gilman; Edward J. Trojnar

[57] ABSTRACT

Multi-layer containers are rendered resistant to hot fats under microwave conditions by coating the substrate which is not fat resistant with a cellulose ester layer such as cellulose acetate propionate.

3 Claims, No Drawings

MICROWAVABLE HEAT AND GREASE RESISTANT CONTAINERS AND METHOD FOR THEIR PREPARATION

BACKGROUND OF THE INVENTION

1. Field of the Invention

This invention relates to containers, adapted for holding food, which are suitable for use in microwave oven cooking.

2. Description of the Prior Art

It is known in the art to produce various shaped articles from foamed and unfoamed thermoplastic materials such as polystyrene sheet by thermoforming methods. Many such articles are containers used for packaging foods.

Many thermoplastic containers, however, are melted by hot fats and cannot be used to package fat-containing foods that are to be heated in a microwave oven. In particular, polystyrene containers are not suitable for microwave cooking. Similarly, containers made from poly(p-methylstyrene) are not, per se, resistant to hot fats when heated in a microwave oven. In general, containers made from thermoplastic polymers or copolymers with a softening temperature below 190° F. (87.8° C.) are not resistant to hot fats when heated in a microwave oven.

Microwavable thermoplastic containers are described in a copending U.S. patent application of John P. Marano and Maya S. Farag, Ser. No. 164,993, filed July 1, 1980, now U.S. Pat. No. 4,335,181. The containers disclosed in that application are made from polymers which are not in themselves microwavable in the presence of hot fats, for example, polystyrene, poly(-para-methylstyrene) and polyethylene. Melt-through in the presence of hot fat is avoided by laminating to the substrate a protective film such as polyacrylonitrile or polyethylene terephthalate.

Containers made from poly(para-methylstyrene) which are resistant to hot fats under microwave cooking conditions are described in U.S. Pat. No. 4,205,114 to Peter J. Canterino and Harold A. Arbit. Fat resistance is obtained by cross-linking the poly(para-methylstyrene) with ionizing radiation.

BRIEF DESCRIPTION OF THE INVENTION

This invention relates to multi-layer containers which are suitable for use in microwave cooking in the presence of hot fat and the method of producing such containers. The outer layer or the substrate of the container is prepared from a material which is not itself suitable for microwave cooking, for example foamed polystyrene or poly(para-methylstyrene). The inner layer which contacts the food and serves as a protective layer is advantageously, a cellulose ester such as cellulose acetate or cellulose acetate propionate.

The containers of this invention can be prepared by coating a preformed substrate sheet with the cellulose ester and then thermoforming the coated sheet into the desired container configuration, in the known manner.

DESCRIPTION OF SPECIFIC EMBODIMENTS

One monomer used in preparing the homopolymer or copolymers from which the exterior or substrate of the shaped articles or containers of this invention are made is p-methylstyrene. Others are styrene and alpha monoolefins such as ethylene, and butene-1. It is within the contemplation of this invention to use mixtures of methylstyrene rich in p-methylstyrene. Such mixtures contain at least 90 weight percent, preferably 95–99 weight percent, p-methylstyrene and less than 0.1 percent o-methylstyrene, with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287, incorporated herein by reference.

The substrate polymers contemplated herein are generally polymers and copolymers with a softening temperature below 190° F. (87.8° C.). Such polymers include polyethylene, polybutene-1, and copolymers containing up to about 10 weight percent of comonomer (second named monomer), such as ethylene-propylene, propylene-ethylene, butene-1-ethylene, ethylene-hexene-1, and ethylene-octene-1, styrene, or p-methylstyrene or p-methylstyrene-rich isomer mixture homopolymer or their copolymers containing between about 10 and 1 weight percent conjugated diene, such as butadiene and isoprene. The polymerization reaction is carried out by using methods and catalysts well known in the art for polymerizing olefinic hydrocarbons. The reaction can be carried out in solution, bulk, suspension, or emulsion.

The manner by which foamed sheet, suitable for the substrate or exterior layer, is prepared from the aforedescribed polymers or copolymers is not an essential feature of this invention. The general methods of forming foamed sheet are discussed in U.S. Pat. No. 3,444,283 which is incorporated herein by reference. The preferred method is a direct injection extrusion operation described in U.S. Pat. No. 3,619,445, incorporated herein by reference, which describes the complete direct injection extrusion foam lines. Ser. No. 506,836, referred to in U.S. Pat. No. 3,619,445, is now U.S. Pat. No. 3,444,283. As described in these incorporated patents, nucleating or cell size control agents can be used.

Likewise, the manner by which unfoamed sheet is prepared from the aforedescribed polymers or copolymers is not an essential feature of this invention. Any of the methods well known in the art can be used, such as extrusion through a slot die. The sheet can be oriented or non-oriented.

The cellulose esters which are suitable for use as the interior layer of the containers of this invention are for example cellulose acetates, cellulose acetate propionate and cellulose acetate butyrate. Cellulose acetate propionate is preferred for its processability characteristics, its adhesion to polystyrene and because of their suitability for food use.

The use of cellulose esters, for example, cellulose acetate propionate, results in an additional advantage in the commercial practice of this invention. The advantage is derived from the relative compatibility of cellulose acetate propionate and polystyrene which permits the recycle of scrap constituting two-layer sheet material. Considerable amounts of scrap are generated when containers are manufactured from sheet material as described herein. Since the two layers of the scrap cannot be feasibly separated, it is highly advantageous to be able to mix some of the scrap with virgin polystyrene for use in the exterior layer. Recycling of scrap is possible only when relatively compatible polymers such as polystyrene and cellulose acetate propionate are used in the several layers.

The cellulose ester layer can be applied to the substrate in a variety of ways including laminating and coating. Coating is preferred and can be accomplished by dissolving the cellulose ester in a suitable solvent such as alcohol/acetone mixtures described in the examples. Preferably, the cellulose ester layer is applied by extrusion coating a melt of the cellulose ester onto the preformed foamed or unfoamed substrate. Cellulose acetate propionate is particularly suitable for this method of application because of its excellent processability characteristics in the melt form. The containers of this invention can also be prepared by coextrusion of the described interior and exterior layers.

Although specific reference has been made to two layers and exterior layer which can be foamed and an interior cellulose ester layer it is not intended to exclude other additional layers. It is only essential that the cellulose ester layer form the interior of the container. The outside of the "exterior layer" can be coated and an adhesive layer or the like can be present to assist in the adhesion of the cellulose ester to the substrate.

The processes of thermoforming to produce shaped articles are well known to those skilled in the art. A common method of thermoforming is vacuum forming. The shaped articles produced by thermoforming the foamed or unfoamed sheet laminate can vary widely. Typical shapes that are utilizable include trays, tubs, bowls, cups, and the like. Such shaped articles are adaptable for packaging foods and, particularly, for packaging foods containing fats.

The test procedure used to determine hot fat resistance is to place a piece of uncooked bacon on the test sample and to cook the bacon in a microwave oven for three (3) minutes. Without a protective coating, materials such as foamed polystyrene, will be severely deformed, usually developing a hole in the area in contact with the bacon.

The invention is illustrated by the following non-limiting examples.

EXAMPLE 1

A polystyrene foam tray was coated with a solution of 60 gm cellulose acetate 398.3 (from Eastman), 30 ml methanol, 146 ml acetone.

The solvent was evaporated off in an oven at 80° C. The coated tray was tested against an uncoated foam tray by cooking bacon in it in a microwave oven for 3 minutes. With the coating, the foamed showed a very slight swelling. Without the coating, the foam was burned through by the hot grease from bacon.

EXAMPLE 2

A coating solution was prepared by dissolving 10 grams of cellulose acetate propionate (Eastman Tenite Propionate-311H4) into a mixture containing 10 ml of methanol and 40 ml of acetone. This solution was applied onto polystyrene foam sheet with either a coating blade or a spray gun to give a 0.5 mil coating. This coated sheet was thermoformed into trays. The tray passed a 3 minute bacon cooking test in a 1500 watt Tappan microwave oven with no melt-through, which occurs with uncoated trays in the same test.

EXAMPLE 3

A layer of cellulose acetate propionate (CAP) film (3 mil propionate film from Flex-O-Glass, Inc.) was heat laminated to a polystyrene foam sheet in a one-side heated press. The CAP laminated foam sheet also passed the bacon cooking test.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A multi-layer container adapted for microwave heating in the presence of hot fat comprising an interior layer and at least one thermoplastic exterior layer in contact with said interior layer, which exterior layer is not itself resistant to hot fat under microwave cooking conditions; said interior layer, which provides hot fat resistance, comprising a cellulose acetate propionate; said exterior layer being compatible with cellulose acetate propionate and containing recycled cellulose acetate propionate.

2. The multi-layer container of claim 1 in which said exterior layer comprises foamed polystyrene.

3. The multi-layer container of claim 1 in which said exterior layer comprises a foamed poly(para-methylstyrene) polymer or copolymer.

* * * * *